United States Patent
Murata et al.

(10) Patent No.: US 12,001,271 B2
(45) Date of Patent: Jun. 4, 2024

(54) NETWORK MONITORING APPARATUS, METHOD, AND PROGRAM

(71) Applicant: Nippon Telegraph and Telephone Corporation, Tokyo (JP)

(72) Inventors: Naomi Murata, Musashino (JP); Satoshi Suzuki, Musashino (JP); Haruhisa Nozue, Musashino (JP); Shunsuke Kanai, Musashino (JP); Fumika Asai, Musashino (JP); Kazuaki Akashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 61 days.

(21) Appl. No.: 17/778,448

(22) PCT Filed: Nov. 20, 2019

(86) PCT No.: PCT/JP2019/045426
§ 371 (c)(1),
(2) Date: May 20, 2022

(87) PCT Pub. No.: WO2021/100140
PCT Pub. Date: May 27, 2021

(65) Prior Publication Data
US 2022/0398143 A1  Dec. 15, 2022

(51) Int. Cl.
*G06F 11/07* (2006.01)
(52) U.S. Cl.
CPC ...... *G06F 11/0751* (2013.01); *G06F 11/0709* (2013.01)
(58) Field of Classification Search
CPC .......... H04L 63/1425; H04L 43/0817; G06F 11/0751; G06F 11/0709; G06F 11/07
(Continued)

(56) References Cited

U.S. PATENT DOCUMENTS

| 10,607,478 B1* | 3/2020 | Stewart | G08B 13/00 |
| 2007/0192474 A1* | 8/2007 | Decasper | H04L 67/306 |
| | | | 709/223 |

(Continued)

FOREIGN PATENT DOCUMENTS

| JP | H11212831 | 8/1999 |
| JP | 2006259811 | 9/2006 |

(Continued)

*Primary Examiner* — Meng Vang
(74) *Attorney, Agent, or Firm* — Fish & Richardson P.C.

(57) ABSTRACT

As an embodiment of the present invention, a network monitoring apparatus includes a combination rule storage section where a combination rule is registered; and the combination rule includes a combination of a plurality of failure event information to be monitored, and new event information to which the combination of the plurality of failure event information is to be changed. In this state, the network monitoring apparatus collects a plurality of failure event information from network apparatuses; extracts, from the plurality of failure event information collected, a combination of a plurality of failure event information detected to occur within a unit time; and collates the combination of the plurality of failure event information extracted with the combination of the plurality of failure event information defined to be monitored in the combination rule. Then, when the combination of the plurality of failure event information extracted matches in content and occurrence sequence with the combination of the plurality of failure event information defined to be monitored in the combination rule, the network monitoring apparatus adds the new event information included in the combination rule to the combination of the plurality of failure event information extracted, or alternatively, replaces the combination of the plurality of failure event information extracted with the new event information.

12 Claims, 8 Drawing Sheets

(58) Field of Classification Search
USPC ......................................................... 709/224
See application file for complete search history.

(56) References Cited

U.S. PATENT DOCUMENTS

| | | | |
|---|---|---|---|
| 2008/0120406 A1* | 5/2008 | Ahmed ............... | G06F 11/3414 |
| | | | 709/224 |
| 2011/0208679 A1 | 8/2011 | Watanabe et al. | |
| 2019/0387011 A1* | 12/2019 | Du ..................... | H04L 63/1425 |
| 2020/0053112 A1* | 2/2020 | Torisaki ................. | H04L 67/12 |

FOREIGN PATENT DOCUMENTS

| | | |
|---|---|---|
| JP | 2011170802 | 9/2011 |
| JP | 2012203431 | 10/2012 |
| JP | 2018028778 | 2/2018 |

* cited by examiner

Fig. 6B

| Link Down | + | Link UP | → | NATURAL RESTORATION |

NETWORK MONITORING APPARATUS, METHOD, AND PROGRAM

CROSS-REFERENCE TO RELATED APPLICATIONS

This application is a National Stage application under 35 U.S.C. § 371 of International Application No. PCT/JP2019/045426, having an International Filing Date of Nov. 20, 2019. The disclosure of the prior application is considered part of the disclosure of this application, and is incorporated in its entirety into this application.

TECHNICAL FIELD

An aspect of the present invention relates to a network monitoring apparatus, a network monitoring method, and a program, each configured, based on a failure event occurring in a network apparatus, to presume an area causing an occurrence of a failure.

BACKGROUND ART

In recent years, due to widespread of Internet of Things (IoT) services, a large number of network apparatuses, such as a gateway, a router, or various servers, are connected to a communication network. Here, in order to manage the communication network stably, when a failure occurs in the network apparatuses, it is highly important to presume an area where the failure occurs.

In view of this, proposed is a related-art technology including: extracting an occurrence pattern of failure events of various types that occur in a plurality of network apparatuses; based on the occurrence pattern, creating a rule for determining an area causing each of the failure events; and collating an occurrence pattern of a failure event that newly occurs with the rule created, so as to presume an area causing the failure event that newly occurs (see PTL 1).

CITATION LIST

Patent Literature

PTL 1: JP 2018-028778 A

SUMMARY OF THE INVENTION

Technical Problem

However, in the related-art technology to presume areas causing failure events, the area causing the failure event that newly occurs is presumed based on each single piece of the failure event information that previously occurred in chronological order. Thus, for example, when a network apparatus experiences what is typically called "flapping" that goes through a link up state and a link down state repeatedly, the failure is presumed only based on event information regarding the link down state. Here, even when the network apparatus is subsequently in the link up state and thus the failure has been recovered, a network failure may be wrongly presumed.

In view of the respects described above, an object of the present invention is to provide a technology to presume the failure at high accuracy even in an unstable operating state of the network apparatus, such as the flapping.

Means for Solving the Problem

A network monitoring apparatus, a network monitoring method, and a program, each according to an aspect of the present invention includes:

collecting a plurality of event information occurring in a network;

extracting, from a collection of the plurality of event information collected, a combination of a plurality of event information to be collated;

determining, by collating the combination of the plurality of event information extracted with a combination rule predetermined, whether or not the plurality of event information extracted and an occurrence sequence of the plurality of event information extracted match a plurality of event information specified to be monitored in the combination rule and an occurrence sequence of the plurality of event information specified to be monitored in the combination rule; and changing, in accordance with a determination that the plurality of event information extracted and the occurrence sequence of the plurality of event information extracted match the plurality of event information specified to be monitored in the combination rule and the occurrence sequence of the plurality of event information specified to be monitored in the combination rule, the plurality of event information extracted to new event information.

Effects of the Invention

With a technology according to an aspect of the present invention, it is possible to presume a failure at high accuracy even in an unstable operating state of a network apparatus, such as flapping.

BRIEF DESCRIPTION OF DRAWINGS

FIG. 6B is a diagram showing an example of a case where the previous event information is replaced with the new event information.

DESCRIPTION OF EMBODIMENTS

Hereinafter, an embodiment of the present disclosure will be described in detail with reference to the drawings.

Embodiment

Configuration Example (1) System

Figure 1:
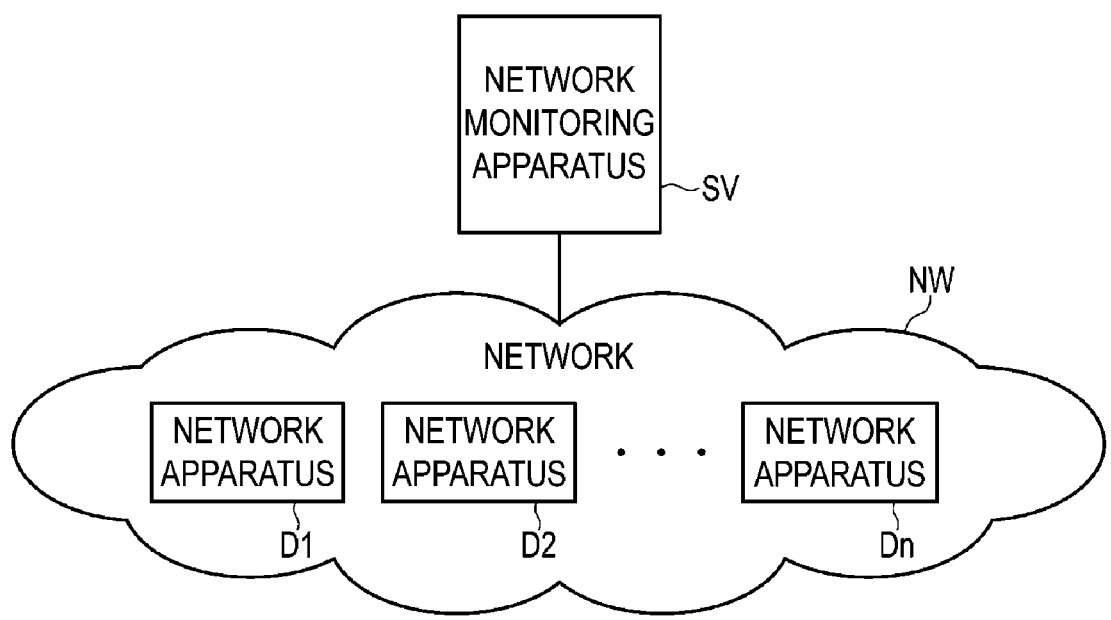
FIG. 1 is a schematic configuration diagram of a network system including a network monitoring apparatus according to an embodiment of the present invention.

FIG. 1 is a diagram showing an overall configuration of a network system including a network monitoring apparatus according to an embodiment of the present invention. The network system includes a network monitoring apparatus SV in a network NW where a plurality of network apparatuses, i.e., network apparatuses D1 to Dn, are included. The network monitoring apparatus SV is configured to monitor a failure occurring in each of the plurality of network apparatuses D1 to Dn.

The network apparatuses D1 to Dn are, for example, gateway or router apparatuses, and connect a local area network (LAN) to a host network (World Wide Network (WAN)) such as Internet. Note that, the network apparatus is not limited to an apparatus for connecting the networks described above, and may also be a relay apparatus provided in the network, or a server apparatus connected to the network.

(2) Network Monitoring Apparatus

Figure 2:
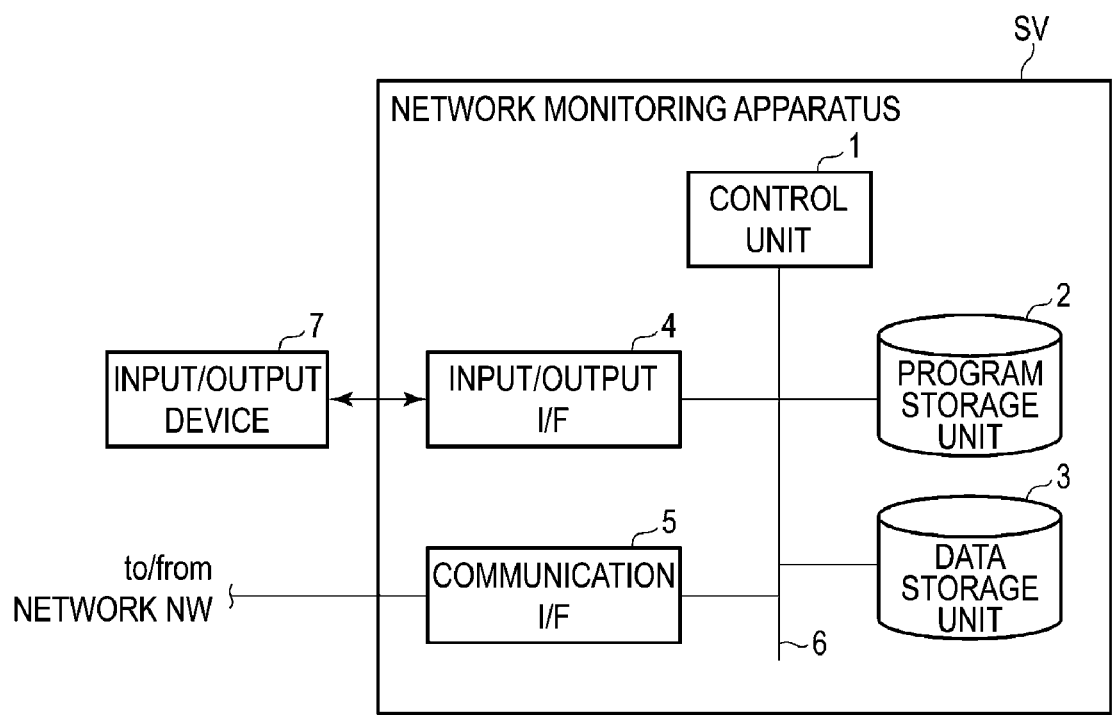
FIG. 2 is a block diagram showing a hardware configuration of the network monitoring apparatus of FIG. 1.
Figure 3:
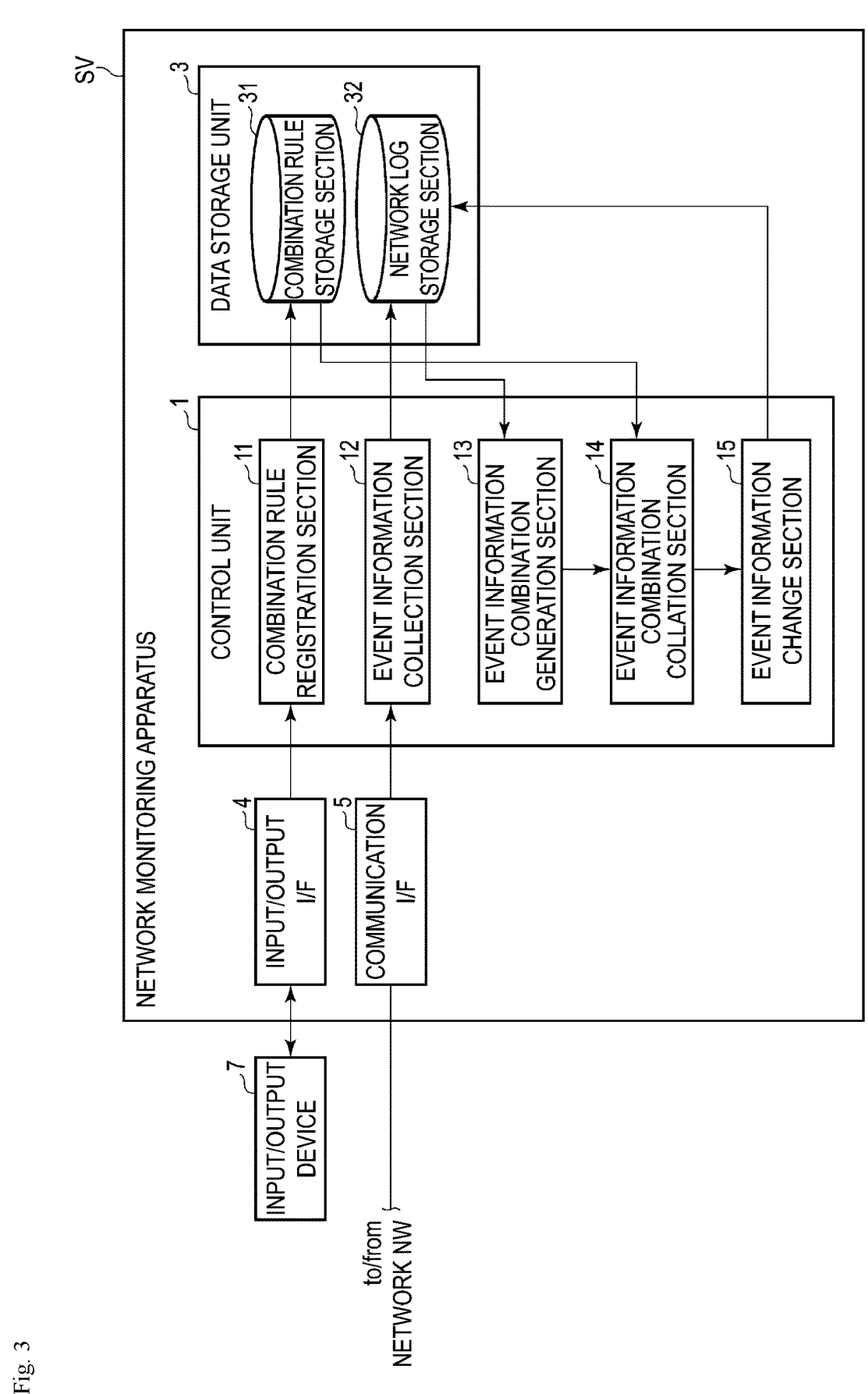
FIG. 3 is a block diagram showing a software configuration of the network monitoring apparatus of FIG. 1.

FIG. 2 and FIG. 3 are block diagrams, respectively, showing a hardware configuration and a software configuration of the network monitoring apparatus SV.

The network monitoring apparatus SV is a computer, for example, a server computer or a personal computer. The network monitoring apparatus SV includes a control unit 1, including a hardware processor, such as a central processing unit (CPU). The program storage unit 2, the data storage unit 3, the input/output interface (input/output I/F) 4, and the communication interface (communication I/F) 5 are connected to the control unit 1 via the bus 6.

The program storage unit 2 is, for example, a non-volatile memory, e.g., a hard disk drive (HDD) or a solid state drive (SSD) that is readable and writable at any time, working as a main storage medium. The program storage unit 2 stores, in its storage region, a middleware such as an operation system (OS), and a program configured to execute a variety of processes according to the embodiment of the present invention. Note that, as the storage medium, the HDD or the SSD may be combined with a read only memory (ROM).

The data storage unit 3 is, for example, the HDD or the SSD combined with a random access memory (RAM). The data storage unit 3 includes, in its storage region, a combination rule storage section 31 and a network log storage section 32, each to be used in the embodiment of the present invention.

The combination rule storage section 31 stores a combination rule that is used to change a combination of a plurality of event information, each of which is to be monitored, to new event information. An object to be monitored in the combination rule is, for example, one of or the plurality of network apparatuses D1 to Dn. Here, the combination rule is configured as follows: a combination of a plurality of event information, which specifically occurred in the one of or the plurality of network apparatuses D1 to Dn at different times or at a same time within a unit time T predetermined, is selected; and in correspondence to the combination of the plurality of event information that has been selected, the combination rule specifies new event information, to which the combination of the plurality of event information selected is to be changed. Note that, the combination of the plurality of event information selected includes information representing contents and an occurrence sequence of the plurality of event information selected.

The network log storage section 32 stores the plurality of event information collected from the plurality of network apparatuses D1 to Dn in chronological order, where each of the plurality of event information collected is associated with occurrence time of the corresponding event information. The plurality of event information collected include, for example, various alarms in response to faults, malfunctions, or the like of the network apparatuses D1 to Dn, and information representing a transition of an operating state of each of the network apparatuses D1 to Dn, such as a link down state and a link up state. Note that, hereinafter, a collection of the event information of these types will be referred to as a network log.

The input/output I/F 4 has an input/output device 7 connected thereto. The input/output device 7 is, for example, any one of a plurality of man-machine interface devices, such as an input device (e.g., keyboard), a storage device for storing data, and a display device or a printing device. The input/output I/F 4 acquires, from the input device or the storage device described above, the combination rule for the plurality of event information, the combination rule created by an administrator of the network, and then passes the combination rule to the control unit 1. Concurrently, the input/output I/F 4 receives display data or print data, each outputted from the control unit 1, and outputs the display data to the display device for display, or outputs the print data to the printing device for printing.

The communication I/F 5 is configured, under control of the control unit 1, to receive the event information from each of the network apparatuses D1 to Dn via the network NW. The communication I/F 5 is, for example, a wired network interface.

The control unit 1 includes a combination rule registration section 11, an event information collection section 12, an event information combination extraction section 13, an event information combination collation section 14, and an event information change section 15, each of which functions to perform a corresponding one of the processes according to the embodiment of the present invention. The control unit 1 causes the hardware processor to execute the program stored in the program storage unit 2 such that each of the combination rule registration section 11, the event information collection section 12, the event information combination extraction section 13, the event information combination collation section 14, and the event information change section 15 functions to perform the corresponding process.

The combination rule registration section 11 receives the combination rule for the plurality of event information, the combination rule created by the administrator of the network, from the input/output device 7 (e.g., the keyboard or the storage medium) via the input/output I/F 4, and then stores the combination rule in the combination rule storage section 31.

The event information collection section 12 receives event information regarding the failure from each of the network apparatuses D1 to Dn via the communication I/F 5. Then, based on the occurrence time of the event included in each of the event information that has been received, the information collection section 12 stores the corresponding event information in the network log storage section 32 in the chronological order.

Based on each of the event information stored in the network log storage section 32, the event information combination extraction section 13 extracts the combination of the plurality of event information that occurred at the different times or at the same time within each of the unit time T (having a predetermined length of time).

The event information combination collation section 14 collates the combination of the plurality of event information, which the event information combination extraction section 13 has generated, with the combination of the event information described to be monitored in the combination rule that the combination rule storage section 31 stores. Then, the event information combination collation section 14 determines whether or not the combination of the event information extracted and the occurrence sequence of the event information extracted match ones in the combination rule.

When the combination of the event information extracted has been detected to match the one in the combination rule by the event information combination collation section 14, the event information change section 15 adds the new event information, which is included in the combination rule as a candidate for change, to the combination of the event information detected as above, or alternatively, replaces the combination of the event information detected as above with the new event information.

Operation Example

Next, an operation of the network monitoring apparatus configured as described above will be described.

Figure 4:
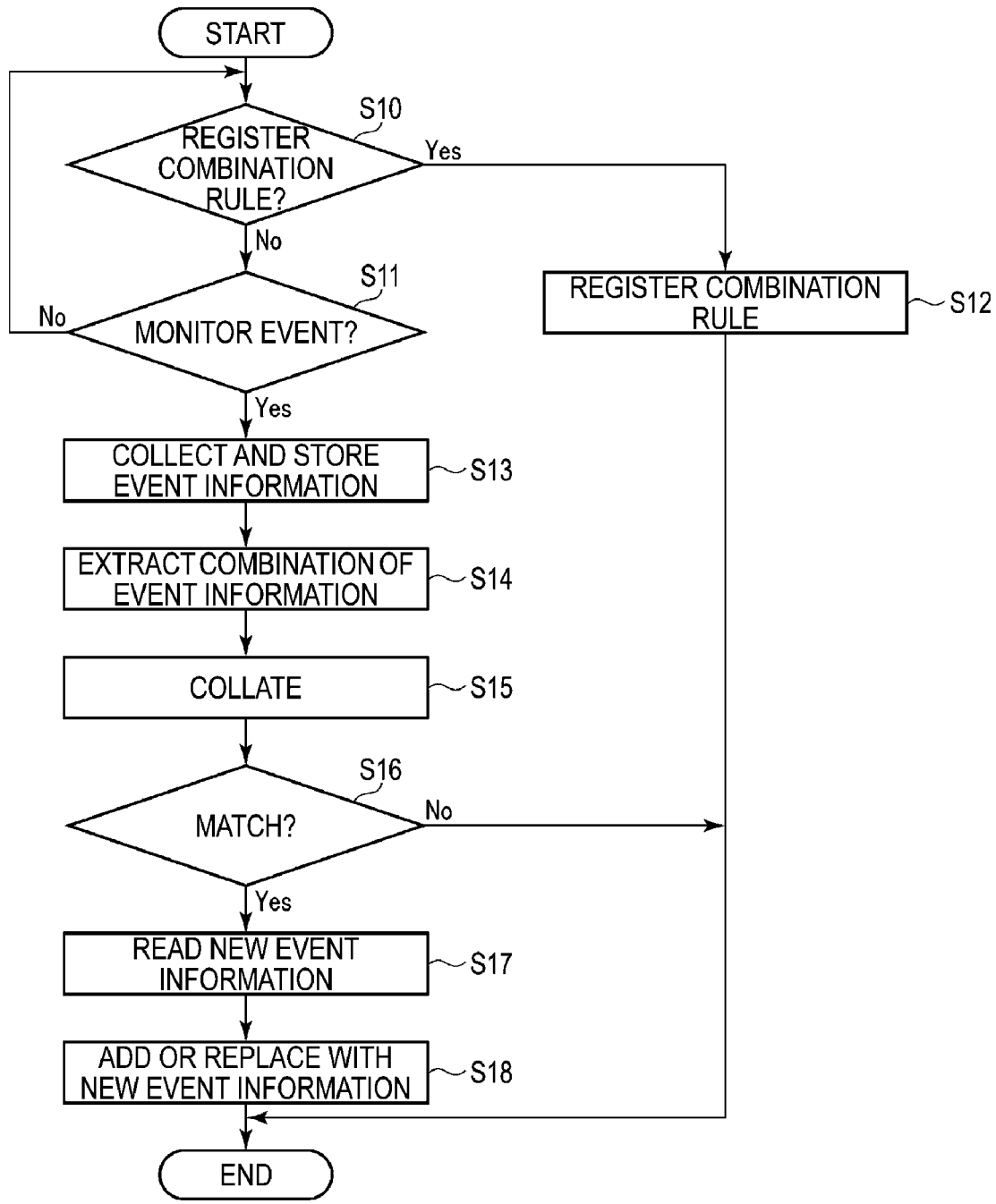
FIG. 4 is a flowchart showing a sequence and content of a process in the network monitoring apparatus of FIG. 3, the process configured to control monitoring of an event.

FIG. 4 is a flowchart showing a sequence and content of a process in the network monitoring apparatus SV.

(1) Registration of Combination Rule

A method to create the combination rule for the event information to be monitored corresponds to a method where the administrator of the network manually creates and registers the combination rule, or a method where the network monitoring apparatus SV automatically creates and registers the combination rule.

As the method where the administrator of the network manually creates the combination rule, the administrator does so based on, for example, event information that previously occurred in each of the network apparatus D1 to Dn, or his/her own experiences. More specifically, the administrator of the network refers to a history of the event information that previously occurred, so as to extract a combination of event information corresponding to the "flapping", which goes through the link down state and the link up state repeatedly, or the like. Subsequently, the administrator creates the combination rule including the combination of the event information extracted and the new event information as the candidate for change, the candidate to which the combination of the event information extracted is to be changed. Then, the administrator of the network registers the combination rule that has been created into the network monitoring apparatus SV by using the keyboard or the storage medium of the input/output device 7.

The network monitoring apparatus SV monitors a request for registration of the combination rule in step S10 under control of the combination rule registration section 11. In this state, when the request for registration has been inputted by the input/output device 7, in step S12, the combination rule registration section 11 acquires, via the input/output I/F 4, information representing the combination rule inputted by the input/output device 7; and the combination rule registration section 11 stores the information representing the combination rule acquired into the combination rule storage section 31.

On the other hand, as the method where the network monitoring apparatus SV automatically creates and registers the combination rule, the control unit 1 of the network monitoring apparatus SV executes, for example, machine learning based on a learned model, so as to create the combination rule for the plurality of event information to be monitored. The control unit 1 uses as reference data, for example, examples that the administrator of the network has presumed and handled; and based on the plurality of event information and the causes of the plurality of event information, which have been obtained from the failures detected to occur in the network NW and the countermeasures implemented for the failures, the control unit 1 executes the machine learning to create the combination rule. Consequently, the combination rule is created, the combination rule including the combination of the event information corresponding to an event, such as the "flapping" or "double failure of a redundant system device", and the new event information as the candidate to which the combination of the event information described above is to be changed. Then, under the control of the combination rule registration section 11, the information representing the combination rule created is stored in the combination rule storage section 31.

Note that, in this case, in order to detect the combination of the plurality of event information to be monitored, the network monitoring apparatus SV may input the history of the event information that previously occurred to the learned model, or may input the event information occurring during the operation of the network system to the learned model.

(2) Collection of Event Information

When the combination rule for the failure events to be monitored has been registered as described above, in step S11, the network monitoring apparatus SV monitors the occurrence of the event information under control of the event information collection section 12. In this state, when the event information regarding the failure has been transmitted from each of the network apparatuses D1 to Dn, in step S13, the event information collection section 12 receives the event information via the communication I/F 5. Then, based on the information representing the occurrence time of the failure included in the event information, the event information collection section 12 stores the event information above into the network log storage section 32.

Figure 5:
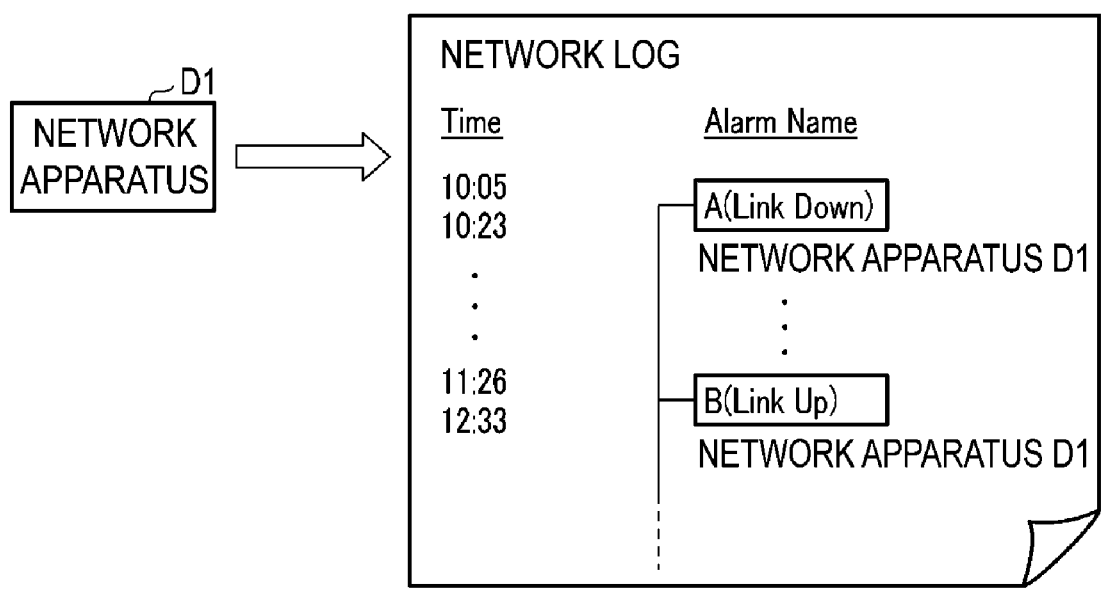
FIG. 5 is a diagram showing an example of a network log.

FIG. 5 is a diagram showing an example of the event information stored in the network log storage section 32. In the example of FIG. 5, in the network apparatus D1, a failure A (link down) occurred at time 10:05 to 10:23, and subsequently a failure B (link up) occurred at time 11:26 to 12:33.

(3) Extraction of Combination of Event Information

When the event information has been stored in the network log storage section 32, the network monitoring apparatus SV proceeds to step S14. Under control of the event information combination extraction section 13, in the step S14, from the network log stored in the network log storage section 32, i.e., the collection of the plurality of event information, the network monitoring apparatus SV extracts the combination of the plurality of event information that occurred within the unit time T. For example, in FIG. 5, when the unit time T is set to be three hours, the event information combination extraction section 13 extracts event information A and event information B, both of which occurred within three hours before 12:33 as the latest time. Then, the event information combination extraction section 13 passes a combination of the event information A and the event information B to the event information combination collation section 14.

(4) Collation of Combination of Event Information

Next, the network monitoring apparatus SV proceeds to step S15. Under control of the event information combination collation section 14, in the step S15, the network monitoring apparatus SV collates the combination of the event information A and the event information B extracted with the combination rule stored in the combination rule storage section 31. In this state, in accordance with the occurrence sequence, each of the event information extracted is collated with the event information in the combination rule.

Note that, when the number of the combination of the event information extracted is two or more, each of the plurality of combinations of the event information extracted is to be collated with the combination rule. Further, when the number of the combination rule is also two or more, each of the plurality of combinations of the event information extracted is to be collated with the plurality of combination rules.

In step S16, the event information combination collation section 14 determines whether or not any one of the combinations of the event information extracted matches in content and occurrence sequence with the combination of the event information specified to be monitored in the combination rule. When any one of the combinations of the event information extracted matches with the combination of the event information specified to be monitored in the combination rule, the event information combination collation section 14 notifies the event information change section 15 of the result. Note that, when any one of the combinations of the event information extracted matches in content with the combination of the event information specified in the combination rule but the occurrence sequence of the corresponding combination of the event information is reverse to the combination of the event information specified in the combination rule, the event information combination collation section 14 is not to determine that the corresponding combination of the event information matches the combination of the event information specified in the combination rule.

(5) Change of Combination of Event Information

When the event information combination collation section 14 has notified the event information change section 15 of the determination that the combination of the event information extracted matches with the combination of the event information specified in the combination rule, the network monitoring apparatus SV proceeds to step S17. Under control of the event information change section 15, in the step S17, the network monitoring apparatus SV reads, from the combination rule storage section 31, the new event information included in the combination rule as the candidate for change. In step S18, having read the new event information, the event information change section 15 adds the new event information to the combination of the event information A and the event information B extracted, or alternatively, replaces the combination of the event information A and the event information B extracted with the new event information.

Figure 6A:
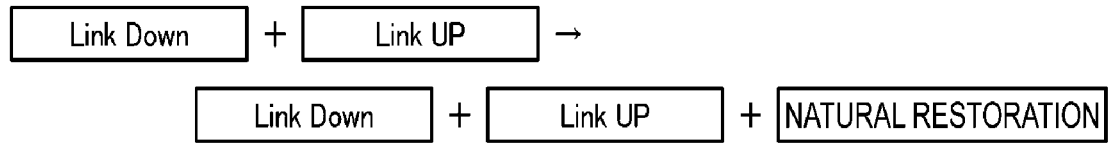
FIG. 6A is a diagram showing an example of a case where new event information is added to previous event information.

FIG. 6A is a diagram showing an example where "natural restoration", which is the new event information as the candidate for change, is added to the combination of the event information A (link down) and the event information B (link up) extracted.

Figure 6B:
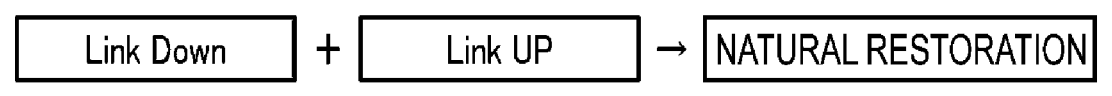

FIG. 6B is a diagram showing an example where the combination of the event information A (link down) and the event information B (link up) extracted is replaced with the new event information as the candidate for change.

In other words, when the same network apparatus was in the link down state, and a little later, in the link up state within the unit time T, the event information combination collation section 14 determines that the combination of the event information A and the event information B generated matches the combination of the event information to be monitored. Accordingly, the event information change section 15 adds the new event information as the candidate for change to the combination of the event information A and the event information B, or alternatively, replaces the combination of the event information A and the event information B with the new event information as the candidate for change. Then, the event information change section 15 updates the combination of the event information stored in the network log storage section 32, the combination of the event information to which the combination of the event information A and the event information B corresponds.

Figure 7:
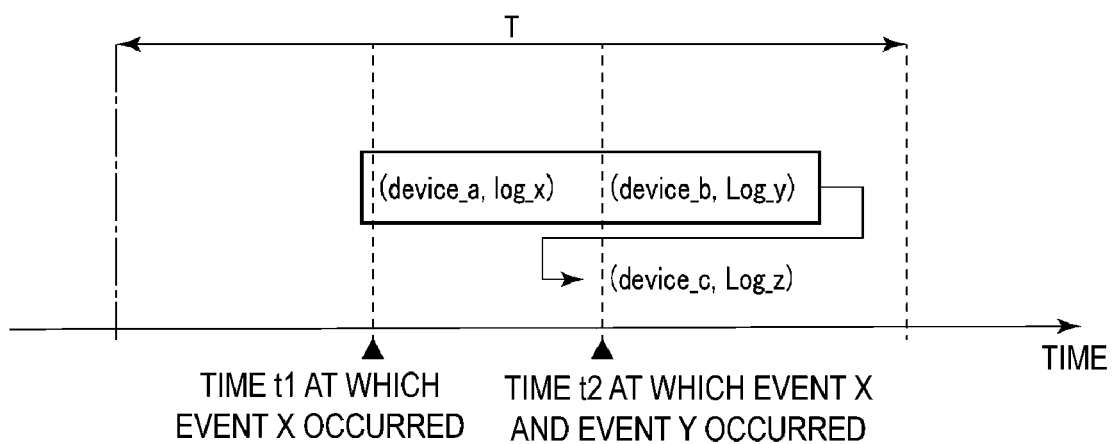
FIG. 7 is a diagram showing an example of a combination of event information to be monitored, and showing an example of new event information to be generated when the combination of the event information is detected.

FIG. 7 is a diagram showing another example where the combination of the plurality of event information is changed. In the example of FIG. 7, a combination of event information (device_a, log_x) detected to occur at time t1 and event information (device_b, log_y) detected to occur at time t2, the time t1 and the time t2 within the unit time T, is replaced with new event information (device_c, log_z).

In other words, even when the combination of the plurality of event information, each of which has been detected to occur in a different network apparatus, matches the combination of the event information defined to be monitored in the combination rule, the combination of the plurality of event information is to be replaced with the new event information.

Effects

As has been described in detail above, in the foregoing embodiment, the network monitoring apparatus SV has the combination rule previously registered in the combination rule storage section 31; and the combination rule includes the combination of the plurality of event information to be monitored, and the new event information to which the combination of the plurality of event information is to be changed. In this state, the network monitoring apparatus SV collects the plurality of event information from the network apparatuses; extracts, from the plurality of event information collected, the combination of the event information detected to occur within the unit time; and collates the combination of the event information extracted with the combination of the event information defined to be monitored in the combination rule. Then, when the combination of the event information extracted matches in content and occurrence sequence with the combination of the event information defined to be monitored in the combination rule, the network monitoring apparatus SV adds the new event information included in the combination rule to the combination of the event information extracted, or alternatively, replaces the combination of the event information extracted with the new event information.

With this configuration, when any one of the network apparatuses D1 to Dn experiences failures such as the "flapping", which goes through the link down state and the link up state repeatedly, it is possible to prevent the event information in this state from being stored as a failure event in the network log storage section 32. Accordingly, when presuming where a failure occurs based on the network log, it is possible, without being affected by the "flapping" or others, to accurately presume where the failure occurs.

Other Embodiments (1) In the foregoing embodiment, the network monitoring apparatus SV includes the combination rule storage section 31. Alternatively, the combination rule storage section 31 may be included in another apparatus, such as a terminal or data base server that the administrator of the network uses, such that the network monitoring apparatus SV acquires the combination rule from the other apparatus.

(2) In the foregoing embodiment, the network monitoring apparatus SV is provided separately from the network apparatuses D1 to Dn. Alternatively, any one of or all of the network apparatuses D1 to Dn may include each of the functions of the network monitoring apparatus SV according to the present invention.

(3) In the foregoing embodiment, the network monitoring apparatus SV collects the event information from each of the network apparatuses D1 to Dn. Alternatively, when the network includes a server apparatus configured to collect the event information detected to occur in each of the network apparatuses D1 to Dn, the network monitoring apparatus SV may acquire the event information from the server apparatus.

(4) In the foregoing embodiment, the new event information as the candidate for change is stored in the corresponding combination rule. The present invention is not limited thereto, and thus alternatively, based on the collation result from the event information combination collation section 14, appropriate event information may be generated as the candidate for change, with respect to the combination of the event information that matches with the combination of the event information in the combination rule.

(5) Any of the other descriptions, such as the configuration of the network monitoring apparatus, the content and sequence of the process in the network monitoring apparatus, the length of the unit time T, the types of the network and the network apparatuses, the type of failure events to be monitored, and the combination of the failure events, may be modified in various manners within a range not deviating from the spirit of the present invention.

In other words, the present invention is not limited to those described in the foregoing embodiment, and the components may be modified in various manners within the range not deviating from the spirit of the present invention. Furthermore, various inventions can be formed by appropriately combining the plurality of components disclosed in the above embodiment. For example, several components may be deleted from all of the components illustrated in the embodiments. Furthermore, components of different embodiments may be appropriately combined with each other.

REFERENCE SIGNS LIST

SV . . . Network monitoring apparatus
D1 to Dn . . . Network apparatus
NW . . . Network
1 . . . Control unit
2 . . . Program storage unit
3 . . . Data storage unit
4 . . . Input/output interface (input/output I/F)
5 . . . Communication interface (communication I/F)
6 . . . Bus
7 . . . Input/output device
11 . . . Combination rule registration section
12 . . . Event information collection section
13 . . . Event information combination extraction section
14 . . . Event information combination collation section
15 . . . Event information change section
31 . . . Combination rule storage section
32 . . . Network log storage section

The invention claimed is:

1. A network monitoring apparatus comprising:
a collection unit, including one or more processors, configured to collect, from network apparatuses of a network, a plurality of event information of events occurring in one or more of the network apparatuses;
a combination rule registration unit, including one or more processors, configured to process an input comprising the collected event information using a machine-learning model to determine a set of combination rules, wherein each combination rule specifies a respective occurrence sequence of events to be monitored, and the machine-learning model has been trained using training examples of past network events and causes or resolutions of the past network events;
an extraction unit, including one or more processors, configured to extract, from the collected event information, a combination of event information of a set of events occurring within a predetermined unit time;
a determination unit, including one or more processors, configured to, by comparing the extracted combination of event information with each of the combination rules, determine whether or not the extracted combination of event information and an occurrence sequence of the set of events match the occurrence sequence of the events specified to be monitored in the combination rule; and
a change unit, including one or more processors, configured to change, in accordance with a determination of the determination unit that the extracted combination of event information and the occurrence sequence of the set of events match the occurrence sequence of the events specified to be monitored in the combination rule, the extracted combination of event information to new event information;
wherein the set of combination rules comprise a first combination rule that specifies an occurrence sequence of repetitions of link down followed by link up events to be monitored, and the change unit is configured to change, in accordance with a determination that the extracted combination of event information and the occurrence sequence of the set of events match the occurrence sequence of the repetitions of link down followed by link up events to be monitored in the first combination rule, the extracted combination of event information to new event information of natural restoration.

2. The network monitoring apparatus according to claim 1, wherein
the combination rule includes the new event information as a candidate for change, and
in accordance with the determination of the determination unit that the extracted combination of event information and the occurrence sequence of the set of events match the occurrence sequence of the events specified to be monitored in the combination rule, the change unit is configured to acquire the new event information included in the combination rule, and change the extracted combination of event information to the new event information acquired.

3. The network monitoring apparatus according to claim 1, wherein
in accordance with the determination of the determination unit that the extracted combination of event information and the occurrence sequence of the set of events the occurrence sequence of the events specified to be monitored in the combination rule, the change unit is configured to add the new event information to the extracted combination of event information.

4. The network monitoring apparatus according to claim 1, wherein
in accordance with the determination of the determination unit that the extracted combination of event information and the occurrence sequence of the set of events match the occurrence sequence of the events specified to be monitored in the combination rule, the change unit is configured to replace the extracted combination of event information.

5. A network monitoring method executed by an information processing apparatus including a processor and a storage medium, the network monitoring method comprising:
   collecting, from network apparatuses of a network, a plurality of event information of events occurring in one or more of the network apparatuses;
   processing an input comprising the collected event information using a machine-learning model to determine a set of combination rules, wherein each combination rule specifies a respective occurrence sequence of events to be monitored, and the machine-learning model has been trained using training examples of past network events and causes or resolutions of the past network events;
   extracting a combination of event information of a set of events occurring within a predetermined unit time from the collected event information;
   determining, by collating the extracted combination of event information with each of the combination rules, whether or not the extracted combination of event information and an occurrence sequence of the set of events match the occurrence sequence of the events specified to be monitored in the combination rule; and
   changing, in accordance with a determination in the determining that the extracted combination of event information and the occurrence sequence of the set of events match the occurrence sequence of the events specified to be monitored in the combination rule, the extracted combination of event information to new event information;
   wherein the set of combination rules comprise a first combination rule that specifies an occurrence sequence of repetitions of link down followed by link up events to be monitored, and the network monitoring method comprises changing, in accordance with a determination that the extracted combination of event information and the occurrence sequence of the set of events match the occurrence sequence of the repetitions of link down followed by link up events to be monitored in the first combination rule, the extracted combination of event information to new event information of natural restoration.

6. The network monitoring method according to claim 5, wherein
   the combination rule includes the new event information as a candidate for change, and
   the method further comprises: in accordance with the determination that the extracted combination of event information and the occurrence sequence of the set of events match the occurrence sequence of the events specified to be monitored in the combination rule, acquiring the new event information included in the combination rule, and changing the extracted combination of event information to the new event information acquired.

7. The network monitoring method according to claim 5, further comprising:
   in accordance with the determination that the extracted combination of event information and the occurrence sequence of the set of events match the occurrence sequence of the events specified to be monitored in the combination rule, adding the new event information to the extracted combination of event information.

8. The network monitoring method according to claim 5, further comprising:
   in accordance with the determination that the extracted combination of event information and the occurrence sequence of the set of events match the occurrence sequence of the events specified to be monitored in the combination rule, replacing the extracted combination of event information.

9. A non-transitory computer readable medium storing a program to cause a processor of a network monitoring apparatus to perform:
   collecting, from network apparatuses of a network, a plurality of event information of events occurring in one or more of the network apparatuses;
   processing an input comprising the collected event information using a machine-learning model to determine a set of combination rules, wherein each combination rule specifies a respective occurrence sequence of events to be monitored, and the machine-learning model has been trained using training examples of past network events and causes or resolutions of the past network events;
   extracting a combination of event information of a set of events occurring within a predetermined unit time from the collected event information;
   determining, by collating the extracted combination of event information with each of the combination rules, whether or not the extracted combination of event information and an occurrence sequence of the set of events match the occurrence sequence of the events specified to be monitored in the combination rule; and
   changing, in accordance with a determination in the determining that the extracted combination of event information and the occurrence sequence of the set of events the occurrence sequence of the events specified to be monitored in the combination rule, the extracted combination of event information to new event information;
   wherein the set of combination rules comprise a first combination rule that specifies an occurrence sequence of repetitions of link down followed by link up events to be monitored, and the network monitoring method comprises changing, in accordance with a determination that the extracted combination of event information and the occurrence sequence of the set of events match the occurrence sequence of the repetitions of link down followed by link up events to be monitored in the first combination rule, the extracted combination of event information to new event information of natural restoration.

10. The non-transitory computer readable medium according to claim 9, wherein
    the combination rule includes the new event information as a candidate for change, and
    the stored program further causes the processor to perform: in accordance with the determination that the extracted combination of event information and the occurrence sequence of the set of events match the occurrence sequence of the events specified to be monitored in the combination rule, acquiring the new event information included in the combination rule, and changing the extracted combination of event information to the new event information acquired.

11. The non-transitory computer readable medium according to claim 9, wherein the stored program further causes the processor to perform:
    in accordance with the determination that the extracted combination of event information and the occurrence sequence of the set of events match the occurrence sequence of the events specified to be monitored in the combination rule, adding the new event information to the extracted combination of event information.

12. The non-transitory computer readable medium according to claim 9, wherein the stored program further causes the processor to perform:
in accordance with the determination that the extracted combination of event information and the occurrence sequence of the set of events match the occurrence sequence of the events specified to be monitored in the combination rule, replacing the extracted combination of event information.

* * * * *